Jan. 17, 1956   H. A. NEUMAN ET AL   2,731,025
MAGNETIC DRAG SPEED MEASUREMENT DEVICE
Filed Aug. 31, 1954   2 Sheets-Sheet 1
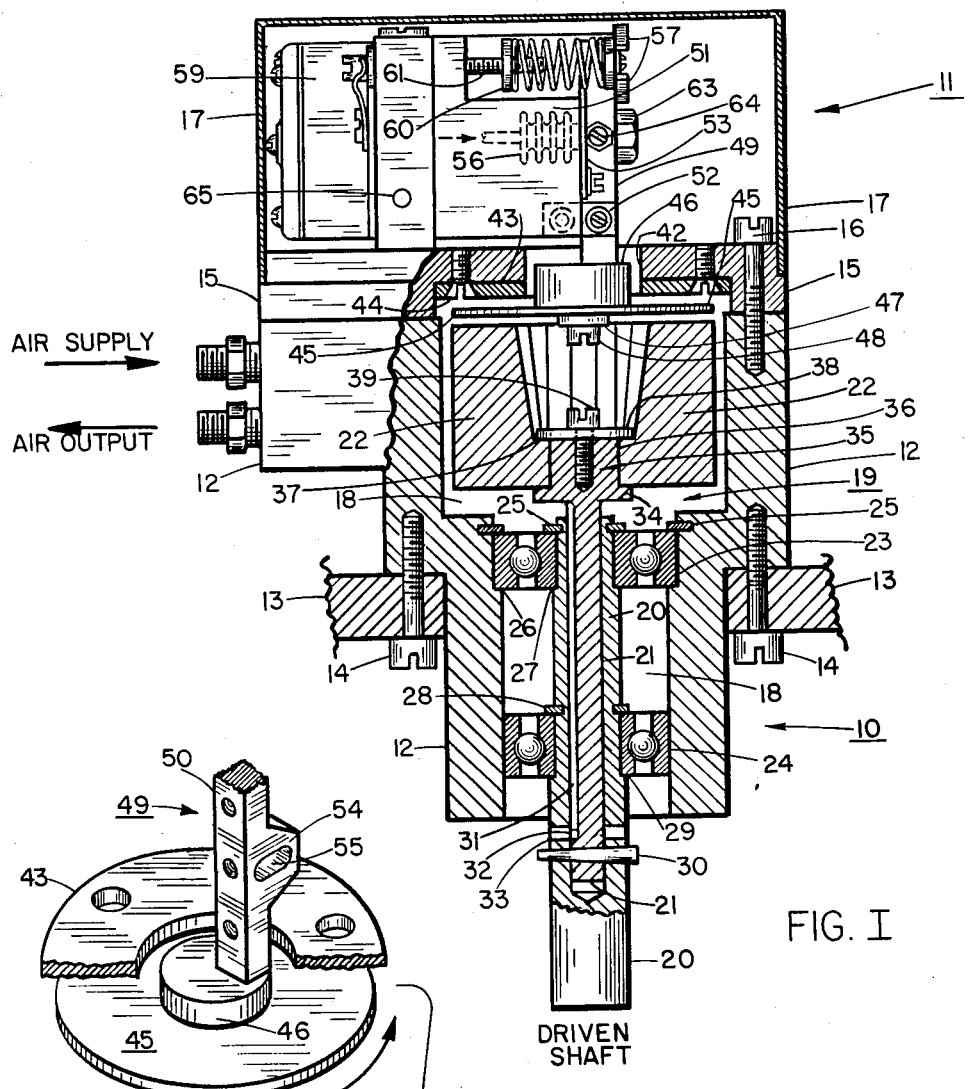
FIG. I
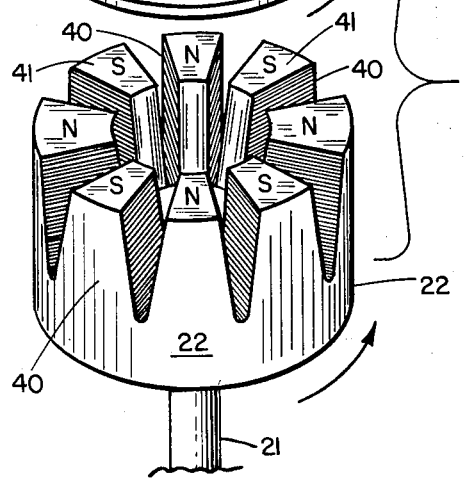
FIG. II
INVENTORS
HERBERT A. NEUMAN
BY STUART W. SWEET
*Lawrence H. Poelon*
AGENT

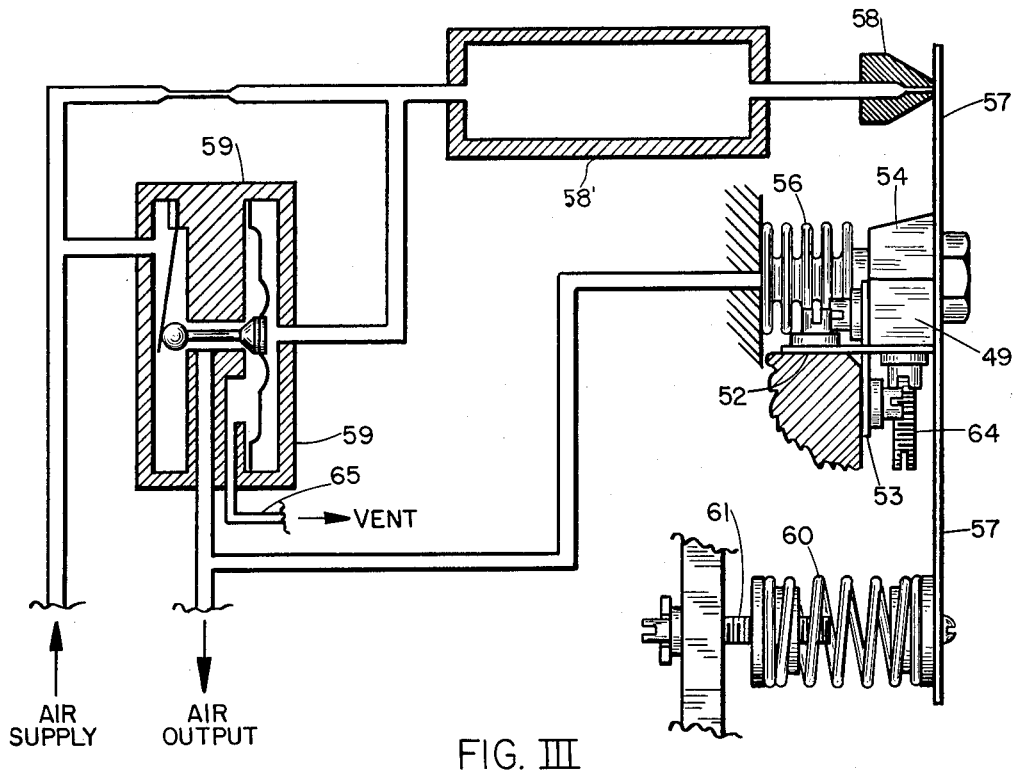
FIG. III
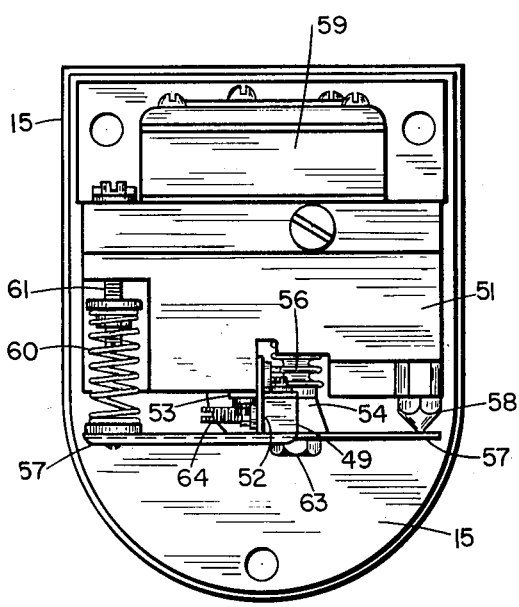
FIG. IV
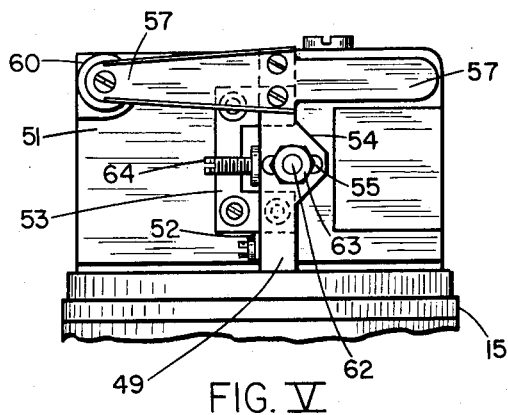
FIG. V
*INVENTORS*
HERBERT A. NEUMAN
STUART W. SWEET
BY Lawrence H. Poeton
AGENT United States Patent Office 2,731,025
Patented Jan. 17, 1956

2,731,025

MAGNETIC DRAG SPEED MEASUREMENT DEVICE

Herbert A. Neuman, Wrentham, and Stuart W. Sweet, Mansfield, Mass., assignors to The Foxboro Company, Foxboro, Mass., a corporation of Massachusetts Application August 31, 1954, Serial No. 453,384

1 Claim. (Cl. 137—85)

This invention relates to instruments for the measurement of speed, wherein relative movement is produced between a magnet and a magnetic field drag member as a means of producing a force in representation of the value of the speed being measured.

Such instruments are important in functions of recording, indicating, and control, especially in the field of industrial process instrumentation. In such functions it is often desirable to produce pneumatic pressures in representation of the measured speed values so that these pressures may be used to operate recording, indicating, or control devices.

In various prior art devices wherein speed measurements have been made with a magnet and magnetic field drag member combination, it has been found that temperature changes in the devices have resulted in undesirable errors with respect to the relation between the forces produced and the speed values which these forces were intended to represent.

This invention provides means for overcoming such difficulties by providing temperature compensation for a magnet and magnetic field drag member combination. As an aid to such temperature compensation, this invention also provides a circulation system for such devices. Further, this invention provides a new and improved magnetic-pneumatic speed transmitter combination.

It is therefore an object of this invention to provide a new and improved speed transmitter device.

Other objects and advantages of this invention will be in part apparent and in part pointed out hereinafter, with reference to the accompanying drawings, in which:

Figure I is an illustration of a speed transmitter embodying this invention, in partial vertical central section;

Figure II is an exploded view in perspective, of the magnet and magnetic field drag member combination of Figure I;

Figure III is a schematic showing of the pneumatic system in the structure shown in Figure I; and Figures IV and V are plan and side views respectively, of the upper pneumatic system portion of the structure shown in Figure I.

Figure I illustrates a specific embodiment of this invention. This embodiment comprises a magnet portion 10 and a pneumatic system portion 11. The magnet portion has a housing 12 mounted on a support 13 by means of bolts 14. A centrally apertured cover plate 15 is mounted on the housing 12 by bolts such as shown at 16, and a deep dish cover 17 is mounted on the cover plate 15 as a means of enclosing the pneumatic system of the pneumatic portion 11.

Within the housing 12 a chamber 18 is provided, open at both ends, and containing a magnet assembly 19. This assembly comprises an outer sleeve shaft 20, an inner, expansion shaft 21 concentrically within the sleeve shaft 20, and a permanent magnet 22, mounted on the outer end of the inner shaft 21.

The entire magnet assembly 19 is mounted in the housing 12 for rotation about its longitudinal axis and is supported in the housing chamber 18 by a pair of ball bearing units 23 and 24 between the housing wall and the outer sleeve shaft 20. The upper ball bearing unit 23 is located vertically between C rings 25 in the housing and the sleeve shaft at the top of the bearing and housing and sleeve shaft shoulders 26 and 27 respectively, at the bottom of the bearing. The lower ball bearing unit 24 is mounted vertically between a C ring 28 in the sleeve shaft at the top of the lower bearing, and a sleeve shaft shoulder 29 at the bottom of the lower bearing. This ball bearing mounting arrangement provides means for low friction rotation of the magnet assembly 19 and at the same time rigidly holds the magnet assembly in a predetermined vertical location. It is important, as will be seen hereinafter, that this vertical location be closely maintained during the operation of the device.

The sleeve shaft 20 is driven at its lower end through suitable means (not shown) in representation of the speed, which is being measured. As an example, the speed range may be from zero to eighteen hundred R. P. M. This outer, sleeve shaft 20 is formed of material with essentially zero temperature coefficient of expansion, for example a composition of 36 per cent nickel, 63.2 per cent iron, and 0.2 carbon, so that for practical purposes the location of the magnet is not changed through any temperature variations as applied to the sleeve shaft 20.

The inner shaft 21, on the other hand, is made of material having a high temperature coefficient of expansion, for example, aluminum. This inner shaft is secured, at its lower end, to the sleeve shaft by a transverse pin 30, and is provided with a piston fit relation with the sleeve shaft 20. Accordingly, the inner shaft expands and contracts appreciably lengthwise upon the application of temperature variations thereto, with the result that the location of the magnet 22 is varied, with temperature, with respect to the device as a whole, for a temperature compensation purpose to be explained hereinafter.

The upper end of the expansion shaft 21 extends substantially beyond the upper end of the sleeve shaft 20, so that the expansion and contraction actions of the expansion shaft are not limited, in ordinary operation, by any abutment action between the magnet 22 or portions of the expansion shaft 21, and the top end of the sleeve shaft 20. As a part of an air circulation system for equalizing temperature throughout the device, the expansion shaft 21 is provided with lengthwise slots along its outer face, as shown at 31. These slots are open to the housing chamber 18 at the top portion of the expansion shaft 21, above the sleeve shaft 20, and are open to atmosphere at the bottom portion of the expansion shaft, through an annular slot 32 in the expansion shaft, communicating with all of the lengthwise slots 31, and through a transverse opening 33 in the sleeve shaft 20, the opening 33 being in communication with the annular slot 32 in the expansion shaft 21. The sleeve shaft 20 laterally closes off the slots 31 so that they become air circulation passages.

The upper end of the expansion shaft 21 is concentrically provided with an annular shoulder 34 and an arbor 35, and the magnet 22 has a central opening 36 for mounting the magnet on the arbor 35, to rest on the expansion shaft shoulder 34. The magnet opening 36 is shouldered at 37, and the magnet is clamped between the expansion sleeve shoulder 34 and a washer 38 on the magnet shoulder 37, by means of a bolt 39 through the washer 38 into the upper end of the expansion shaft 21.

The magnet 22, as seen also in Figure II, is cylindrical, with a group of pole pieces (40) alternating north and south and presenting flat top surfaces 41 to form the top surface of the magnet 22, with this top surface perpendicular to the axis of rotation of the magnet assembly 19. The magnet is a permanent magnet, preferably with a low temperature coefficient of expansion, so that the only effective temperature compensation expansion is provided by the expansion shaft 21.

Extending transversely across the top of the magnet, in substantial spaced relation therewith, the cover plate 15 forms a partial closure for the housing chamber 18, with a central aperture 42 therein. On the under side of the cover plate 15, is an iron "keeper" flux guide ring 43. The ring 43 is secured to the cover plate 15 by screws 44, and is used to direct the main magnetic flux paths between the pole pieces 40 of the magnet 22 so that they extend from the magnet to the flux guide 43 and back to the magnet, across the spacing between the magnet and the flux guide. For this purpose, the spacing between the magnet and the flux guide is made small in comparison with the spacing between adjacent pole pieces in the magnet 22. For example, the pole piece spacing may be in the order of three eighths of an inch, and the spacing between the magnet 22 and the flux guide 43 in the order of one sixteenth of an inch. This arrangement of a magnet and spaced flux guide is presented as a preferred embodiment of this invention. In this specific structure, the temperature compensation action of this invention is accomplished, as will be detailed hereinafter, by movement of the magnet 22 toward and away from the flux guide 43 as a means of varying the density of the flux paths between the magnet and the flux guide.

Between the magnet 22 and the flux guide 43, a drag disc 45 is suspended in a location in the magnetic field paths and in spaced relation with both the magnet and the flux guide. The drag disc is thin, and mounted parallel with the top face of the magnet and in axial alignment with the magnet assembly 19. The spacing between the magnet and the drag disc may be in the order of one sixty-fourth of an inch, and the temperature compensating movement of the magnet 22 toward the flux guide 43 and consequently toward the drag disc 45, may be of the order of three to four thousandths of an inch for full scale movement. In this specific embodiment of this invention the relative spacing of the drag disc 45 as related to the magnet and to the flux guide, is immaterial as long as the drag disc engages neither the magnet nor the flux guide, and as long as sufficient spacing is provided between the drag disc and the magnet to allow full scale temperature compensating movement of the magnet to be accomplished without contact between the drag disc and the magnet.

The drag disc 45 is operatively connected with the magnet 22 only through magnet field interaction therebetween. The suspension of the drag disc 45, as will be detailed later herein, is such as to mount the drag disc for rotation about the longitudinal axis of the magnet assembly 19. As the magnet 22 is rotated in representation of the speed being measured, the initially stationary drag disc 45 is cut by the lines of force in the magnetic flux paths between the magnet and the flux guide. In consequence, eddy currents are set up in the drag disc 45 and drag disc magnetic fields are established by these eddy currents. These magnetic fields interact with respect to the magnetic field of the magnet 22 to produce a force in predetermined relation to the value of the speed being measured. This force results in a torque factor in the drag disc so that as the magnet is rotated, the drag disc tends to rotate.

When the drag disc is heated, either externally or by the eddy currents established therein, the resistivity value of the drag disc is increased, and in consequence the drag disc torque factor is reduced. This action tends to produce an error with respect to the value of the speed being measured, and this invention is particularly concerned with means for compensating for this error.

The heat of the drag disc is transferred to the magnet assembly and the expansion shaft 21 therein, through the body of the instrument and through the atmosphere which surrounds the drag disc. As a consequence, the expansion shaft 21 becomes elongated and the magnet 22 is moved closer to the flux guide 43. Such action increases the density of the magnetic fields in the flux paths betwen the magnet 22 and the flux guide 43 with the result that the torque factor in the drag disc 45 is increased to offset the decrease thereof due to the temperature change in the drag disc.

As a practical matter in the operation of this speed transmitter device, the composition of the drag disc is important. There are two main factors involved: on the one hand it is desirable that the drag disc have low electrical resistivity with respect to the eddy currents therein so that maximum torque may be developed and on the other hand the temperature coefficient of electrical resistivity should be low, to reduce the amount of compensation needed to offset the torque changes due to temperature changes in the drag disc. The preferred composition for the drag disc of this invention is a composition comprising 3.8 to 4 percent manganese, and the remainder copper. A specific, desirable composition is four percent manganese, ninety-six percent copper, in the normally commercially available degree of purity thereof.

Figures IV and V, taken with Figures I and II, provide an illustration of the supporting structure on which the drag disc 45 is hung from above. As in Figures I and II, the drag disc 45 is clamped concentrically, from underneath, to a cylindrical hub 46 by a washer 47 and a bolt 48 extending through the washer 47 and the drag disc 45 and into the hub 46. As shown particularly in Figure II, the hub 46 has secured thereto a square cross section upright bar 49 which extends upward through the flux guide ring 43 and through the cover plate 15, with a corner 50 of the bar in alignment with the center of the hub 46 and consequently with the center of the drag disc 45.

The upright bar 49 is flexure mounted on a housing 51 in the pneumatic portion 11. This is a cross flexure mounting with the flexure axis in alignment with the lengthwise axis of the magnet assembly 19, and consequently in alignment with the center of the drag disc. The flexure pivot axis is therefore essentially coincident with the corner 50 of the upright bar 49. A pair of strip flexures 52 are used at the top and bottom of the bar 49, and a C flexure 53 is used between the strip flexures 52 and at right angles therewith.

The upright bar 49, about midway vertically thereof is provided with a lateral extension 54, with a laterally extending slot 55 therein for receiving and adjusting a pneumatic system feedback bellows 56, see Figures I, III, and IV.

Rotation of the drag disc pivots the upright bar 49 about its corner 50 as an axis, and, with reference to Figures III, IV, and V a pneumatic system baffle arm 57 is transversely mounted on the bar 49. As the bar 49 is pivoted, the baffle arm 57 is consequently also pivoted, about the flexure vertical axis as a center. As in Figures III and IV, such movement varies the restriction of a pneumatic nozzle 58. Thereafter, in the operation of the pneumatic system of Figure III, a pneumatic feedback pressure is applied to the feedback bellows 56, in accordance with the degree of restriction of the pneumatic nozzle 58. A balance position of the baffle arm 57 is thus achieved, since the feedback bellows 56 is off center and opposes the torque of the drag disc, and the pneumatic system output pressure is in predetermined relation to the value of the speed being measured, as expressed in the rotation of the magnet assembly 19 and in the resultant torque developed in the drag discs 45 and transmitted to the bar 49 and the baffle arm 57.

The pneumatic system of Figure III is a conventional pneumatic supply and waste control system. It contains a stability providing capacity chamber 58' in the pipe to the nozzle 58, a pneumatic relay 59 to which the nozzle back pressure is applied in the usual fashion, and the feedback bellows 56, to which the output pressure of the relay 59 is applied.

Figures III and IV show a baffle arm bias spring 60 adjustably mounted on a bolt 61, as a means of establishing the baffle arm 57 in a zero position. Figure V illustrates an adjustment for the feedback bellows 56 toward and away from the axis of rotation of the drag disc 45. As seen outer-endwise in Figure V, a bolt 62 is secured to the outer end of the feedback bellows 56, and this bolt extends through the bar slot 55, and is locked in place along the slot 55 by a nut 63. In lateral alignment with the slot 55, an adjustment lock screw 64 is mounted in the upright bar 49 as a means of providing small, accurate adjustments of the feedback bellows 56 along the slot 55. This is a span adjustment to provide full range of pneumatic output for full range of speed input.

Referring to Figure I, pneumatic circulation is provided in the device by exhausting the pneumatic system relay 59 through its waste vent 65 into the pneumatic system chamber provided by the pneumatic system cover 17. The air thus provided is circulated down through the central aperture of the cover plate 15 and through the central opening of the flux guide ring 43 to the drag disc 45. This air then circulates about the drag disc and down to the expansion shaft slots 31, and from there to atmosphere through the sleeve shaft transverse opening 33. Thus useful and effective means is provided for quickly bringing the expansion shaft 21 to the temperature of the drag disc 45.

With this invention speed measurement errors can be reduced to within one-half of one percent, or less, or reversed. Different ranges of temperature compensation are a matter of design, mainly involving the dimensions and materials of the drag disc 45 and the expansion shaft 21. It may be noted that, with respect to Figure I, the location chosen for the expansion shaft mounting pin 30, along the length of the expansion shaft 21, is a determinant in the amount of magnet movement which is available as a result of application of heat to the expansion shaft.

This invention, therefore, provides a new and useful speed transmitter of the magnet-drag disc type, wherein automatic temperature compensation is provided, and wherein other special features are provided, such as a drag disc of special composition, and a temperature equalizing circulatory system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

Speed measuring apparatus comprising, in combination, a shaft assembly mounted for rotation in response to the movement of a member the speed of which is to be measured, said shaft assembly comprising a sleeve member having a low temperature coefficient of expansion and an expansion shaft mounted in said sleeve member in piston fit relation therewith and pinned thereto at one end of said shaft, with said expansion shaft having a high temperature coefficient of expansion, said shaft, further, being provided with longitudinal slots which form pneumatic passages confined by said sleeve member and having an opening to atmosphere adjacent said pin, a magnet fixed on the other end of said expansion shaft and spaced from said sleeve member, for rotation with said shaft assembly, a fixed magnetic flux guide in spaced relation with said magnet, a drag member between said magnet and said keeper ring and mounted for rotational movement in predetermined spaced relation with said magnet and in the magnetic field thereof whereby said rotation of said magnet produces, in said drag member, a force which at least tends to produce said rotation of said drag member in representation of the speed of said member under test, said force being variable with temperature changes in said drag member, and said expansion shaft providing automatic temperature compensation with respect to said force variation by automatically varying said spaced relation between said magnet and said flux guide in response to temperature variations in said apparatus, a supply and waste pneumatic system including a proportional feedback pneumatic nozzle-baffle-relay arrangement responsive to the interaction between said magnet and said drag member for producing a pneumatic pressure in representation of the speed being measured, and means for directing the waste of said pneumatic system to said drag member and from there into said pneumatic passages of said expansion shaft.

References Cited in the file of this patent

UNITED STATES PATENTS

| | | |
|---|---|---|
| 568,046 | Spratt | Sept. 22, 1896 |
| 647,791 | Armor | Apr. 17, 1900 |
| 937,099 | Schulze | Oct. 19, 1909 |
| 993,910 | Thomson | May 30, 1911 |
| 1,672,189 | Zubaty | June 5, 1928 |
| 2,642,075 | White | June 16, 1953 |

FOREIGN PATENTS

| | | |
|---|---|---|
| 428,860 | France | July 1, 1911 |
| 142,140 | Great Britain | Dec. 16, 1920 |